United States Patent [19]

Bright

[11] Patent Number: 5,440,297

[45] Date of Patent: Aug. 8, 1995

[54] ELECTRICIAN'S FISH TAPE LOCATOR SYSTEM

[76] Inventor: Robert I. Bright, 677 Yorkhaven, Cincinnati, Ohio 45246

[21] Appl. No.: 172,750

[22] Filed: Dec. 27, 1993

[51] Int. Cl.⁶ ............................................. G08B 21/00
[52] U.S. Cl. ........................... 340/686; 254/134.3 FT
[58] Field of Search .................. 340/686, 854.1, 854.2, 340/568, 539, 691, 407, 311.1, 825.44; 254/134.3 FT, 134.3 R; 174/68.1

[56] References Cited

U.S. PATENT DOCUMENTS

| | | | |
|---|---|---|---|
| 2,601,249 | 6/1952 | Brenholdt | 340/686 X |
| 3,145,274 | 8/1964 | Van Scoy et al. | 340/686 X |
| 3,754,275 | 8/1973 | Carter et al. | 340/686 X |
| 4,389,611 | 6/1983 | Pigeon et al. | 324/220 |
| 4,573,829 | 3/1986 | Keene et al. | 254/134.3 FT X |
| 4,917,362 | 4/1990 | Wilson | 254/134.3 FT |
| 5,009,242 | 4/1991 | Prange | 134/113 |

Primary Examiner—Brent Swarthout
Assistant Examiner—Thomas J. Mullen, Jr.
Attorney, Agent, or Firm—Charles R. Wilson

[57] ABSTRACT

A fish tape locator system for use by an electrician comprises a transmitter assembly and a receiver. The system is used by the electrician as an aid in running electric wire through a conduit. The transmitter assembly has a mounting means for attachment to a terminus of the conduit, a switch associated with the mounting means and in alignment with the conduit terminus to be activated by an end of the fish tape as it exits the conduit terminus, and an electronic transmitter coupled to the contact switch to transmit a signal when activated. The receiver worn by or in the general vicinity of the electrician receives the signal from the transmitter and alerts the electrician to the fact the fish tape end has reached the conduit terminus.

15 Claims, 2 Drawing Sheets

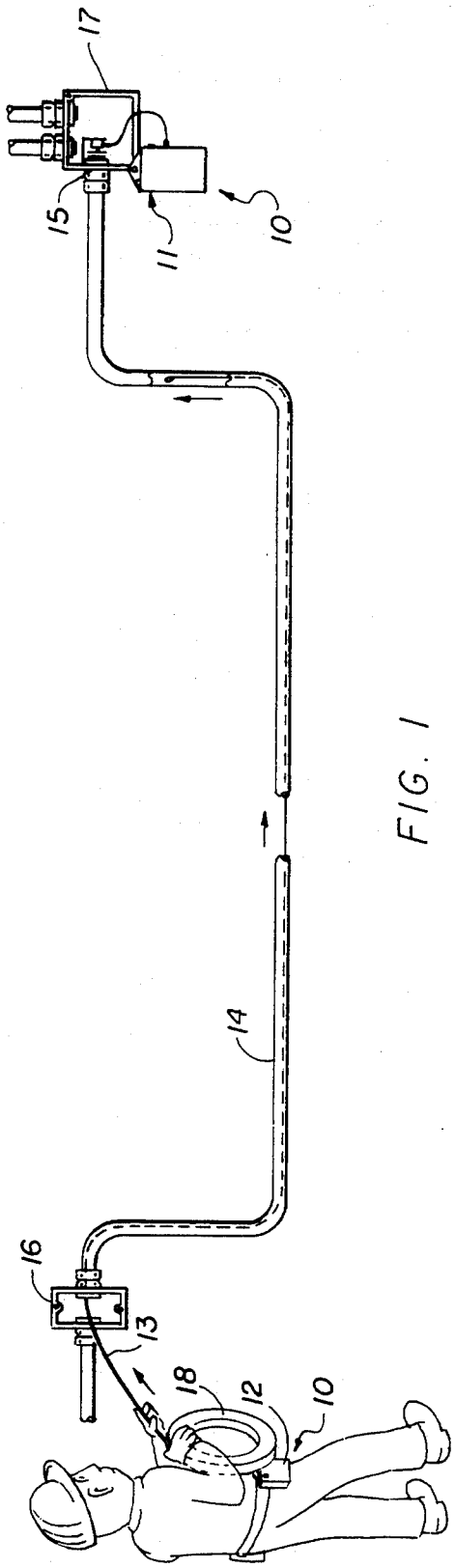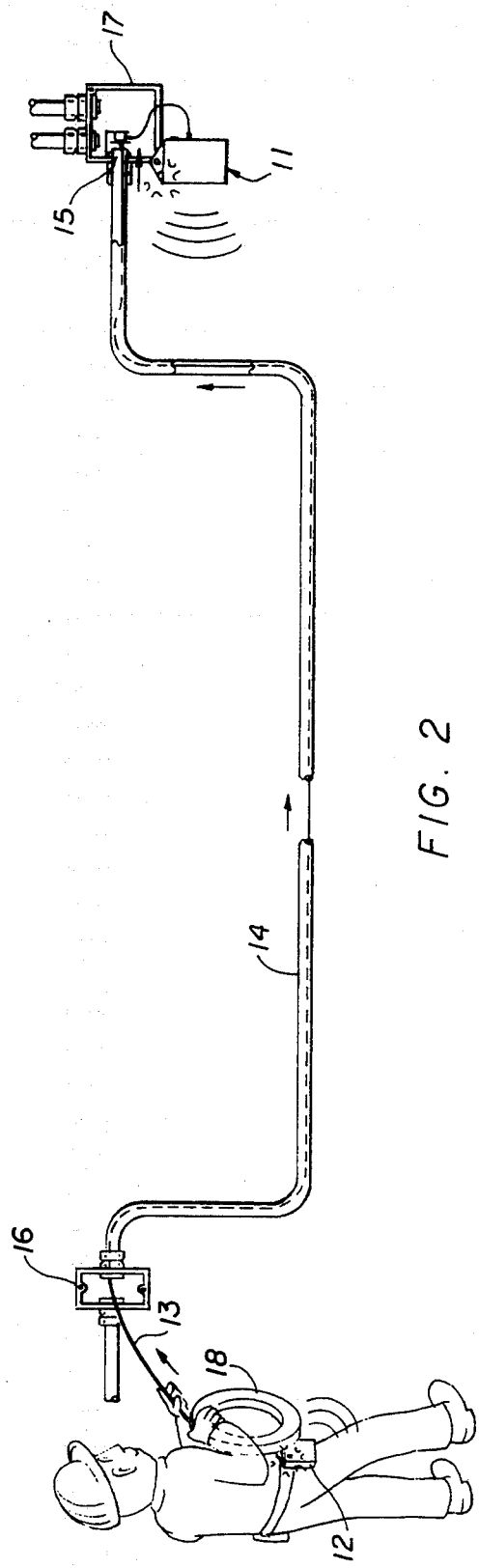

ELECTRICIAN'S FISH TAPE LOCATOR SYSTEM

This invention relates to a locator system. More particularly, it relates to a locator system used by an electrician to determine when a fish tape being forced through a conduit has reached the conduit's terminus.

Industrial plants and commercial establishments have a great demand for electrical service. These businesses typically have electric wires running through ceiling dead spaces and walls. The wires are normally run through metal or plastic conduit that range from one-half inch to two inches in diameter. More than one wire is often run through the conduit. The conduits protect the electric wires from accidental damage and contain the wires in a confined space. Electric wires in many businesses are continually rerouted and added to as business needs dictate. The conduits also facilitate this process.

It is not unusual for an electric wire to extend several feet, e.g. up to one hundred feet from one junction box to another junction box or outlet. The conduits which are used to contain the wire may be in a straight line or may contain one or more bends. Threading a wire through the conduit can prove challenging. An electrician's fish tape is commonly used to aid the process. The fish tape is a semi-rigid though flexible thin metal tape which is wound on a reel. One end of the tape is hook-shaped. In use, the electrician inserts the hook-shaped end of the fish tape into the conduit and then forces it through the conduit as the reel is unwound. The semi-rigid nature of the fish tape allows it to be pushed through the conduit while its flexible nature allows it to pass around curves or even right angle bends in the conduit. Eventually, the hook-shaped end of the fish tape reaches the second end of the conduit. The electric wire is simply secured to the hook-shaped end and pulled along by the fish tape as it is being rewound onto the reel. The electric wire is released from the fish tape after the fish tape is fully retrieved.

A certain degree of skill is required for the electrician to initially force the fish tape through a long conduit, especially one that has bends. The bends provide a point where the fish tape's travel can be obstructed. The electrician may sense that there is an obstruction based on an estimate of fish tape length which has already been forced into the conduit. Other times, the electrician will only know there is an obstruction by walking to the conduit terminus and visually detecting the absence of the fish tape end. This, of course, is time consuming and can be frustrating. Several such trips may be needed before the fish tape has been manipulated past a bend and truly has reached the conduit's terminus.

In accord with a need experienced by many electricians, there has been developed a fish tape locator system. The system is easy to use and reliably alerts the electrician as to when a fish tape end has fully travelled through a conduit and has reached the conduit's terminus.

SUMMARY OF THE INVENTION

An electrician's fish tape locator system comprises a transmitter assembly and a receiver. The system is used to determine when a fish tape forced through a conduit has reached a terminus. The transmitter assembly has a mounting means for attachment to the conduit terminus, a switch mounted adjacent to the conduit terminus and in alignment therewith, and an electronic transmitter coupled to the contact switch. The system also comprises a receiver worn or placed in the general vicinity of the electrician. The electrician initially forces the fish tape through the conduit and if need be manipulates it around bends in the conduit until it reaches the conduit terminus and activates the contact switch. A signal which is transmitted by the transmitter and received by the receiver, alerts the electrician that the fish tape end has reached the conduit terminus.

BRIEF DESCRIPTION OF THE DRAWINGS

FIG. 1 is an environmental view of the fish tape locator system of the invention showing an electrician feeding a fish tape through a conduit.

FIG. 2 is an environmental view of the fish tape locator system of FIG. 1 showing its operation after an end of the fish tape has reached the conduit's terminus.

DETAILED DESCRIPTION OF THE INVENTION

Figure 3:
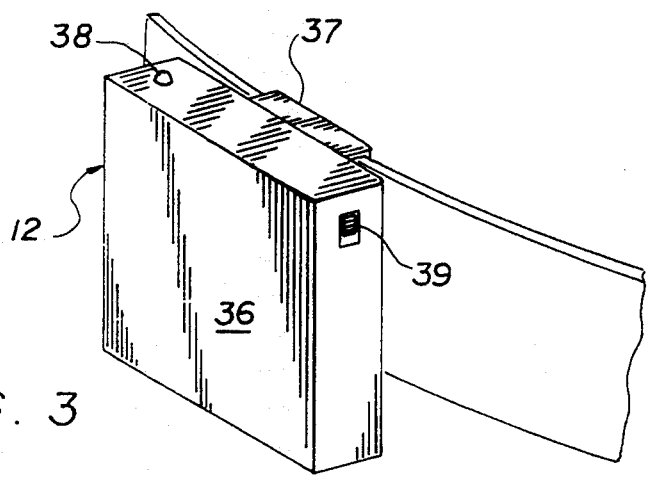
FIG. 3 is a perspective view of a receiver forming a part of the fish tape locator system of FIG. 1.

With reference to FIGS. 1 and 2, there is shown the fish tape locator system 10 of the invention. The system comprises a transmitter assembly 11 and a receiver 12. As shown, it is used by an electrician as an aid in forcing a fish tape 13 through a conduit 14 and alerting him as to when an end of the fish tape has reached a conduit terminus 15. As shown in FIG. 2, the end of the fish tape has reached the conduit terminus and as discussed in detail in the following paragraphs, the transmitter assembly 11 emits a signal which is received by the receiver 12 worn by the electrician.

Still with reference to FIGS. 1 and 2, the conduit 14 is several feet long. It is shown with four right angle bends. The conduit is connected at a first end to a junction box 16 and at a second end to another junction box 17. Conventional attaching means are used for this purpose. The electrician is shown in the process of feeding the fish tape 13 through the junction box 16 and the conduit 14. The fish tape 13 is wound on a reel 18. Such fish tape reels are commercially available and widely used by electricians. The fish tape end has a hook-like member on which an electric wire can be securely attached at the junction box 17 and pulled back through the conduit. The farthest two bends create a potential for the fish tape to be obstructed in its travel. The point of obstruction is sufficiently far that the electrician may very well think the fish tape has reached the conduit terminus. However, with the fish tape locator system of the invention, he is aware that the fish tape is merely obstructed and that he must manipulate the fish tape to cause it to turn the bend and continue in its travel.

Figure 4:
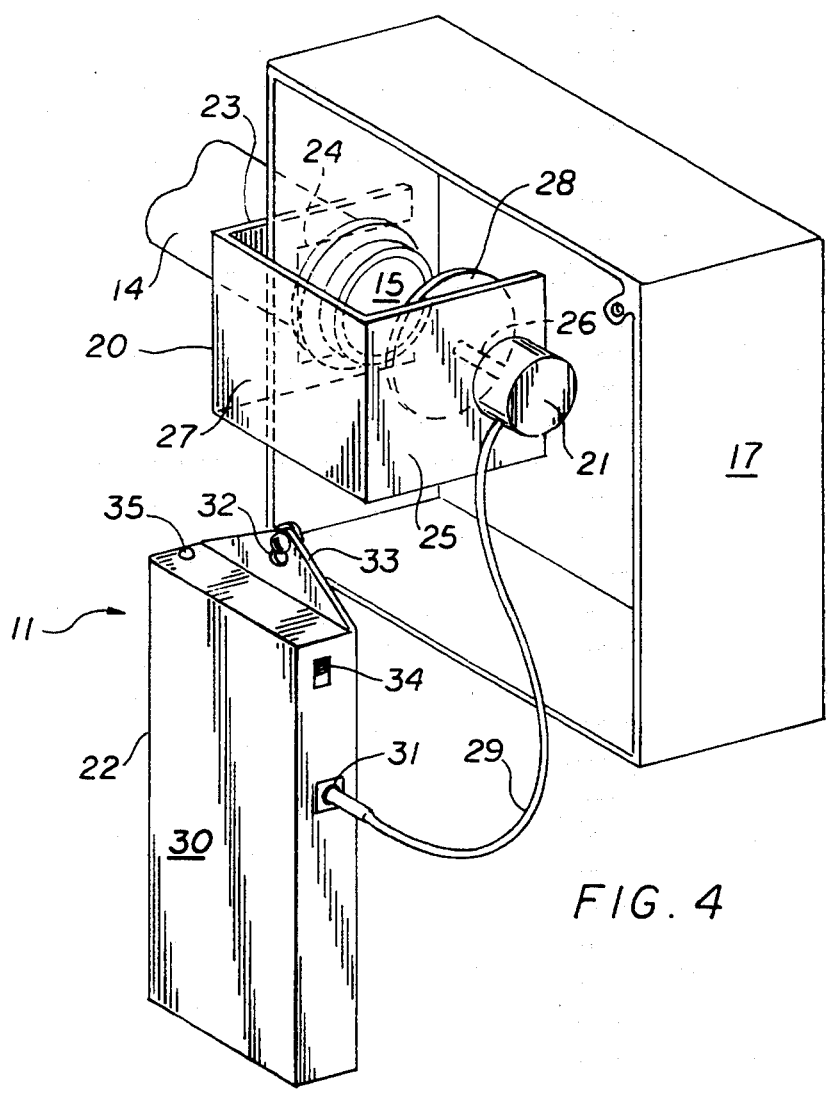
FIG. 4 is a perspective view of a transmitter assembly forming a part of the fish tape locator system of FIG. 1.

As best seen in FIG. 4, the transmitter assembly 11 comprises a bracket 20, a contact switch 21 and an electronic transmitter 22. The bracket 20 is a mounting means for the contact switch 21 to ensure it is in alignment with the conduit terminus. The bracket is U-shaped with a first leg 23 having a slot 24 which is dimensioned to slip over the conduit on the outside of the junction box. A friction fit is sufficient to semi-permanently hold the bracket in position during use and readily remove it once its function is completed. A second leg 25 of the bracket is used to hold the contact switch 21 adjacent the conduit end and in close proximity to it. It has a hole through which a shaft 26 of the contact switch extends. The cross-leg 27 of the bracket has a length such that the second leg 25 and the contact switch 21 are from about one-half inch to about three inches from the conduit terminus and aligned therewith. Other bracket structures can as well be used for the purpose of mounting the contact switch adjacent the conduit terminus.

The contact switch 21 includes a striker plate 28 which when touched with sufficient force will move the shaft 26 which in turn trips the switch 21. Such switches are commercially available. The switch 21 is coupled to the electronic transmitter 22 by a jack plug 29.

The electronic transmitter 22 has a housing 30, a jack plug receptacle 31 to receive the jack plug 29, and a means within the housing to transmit a signal in response to activation of the contact switch. As shown, the housing 30 of the transmitter 22 has a hole 32 on an upper flange 33 which is used to conveniently hook onto a screw head on the junction box 17. A switch 34 and a LED 35 are optionally provided to indicate when the transmitter is in an operational mode.

The transmitter assembly 11 can take other forms. For example, a housing with an attaching means on one wall to connect directly to the conduit terminus and the contact switch mounted within the housing and positioned to receive a force from the fish tape end is possible. An electronic transmitter coupled to the contact switch is mounted within the housing or on an outside wall of the housing.

As shown in FIG. 3, the receiver 12 is constructed to be worn on the belt of the electrician. It has a housing 36 and belt clip 37. Within the housing 35 is a receiving mechanism for detecting a signal transmitted by the electronic transmitter 22 and converting it into a noticeable form. For instance, the receiver is able to emit sound, light or vibration to alert the electrician that the contact switch has been activated.

Optionally, a LED 38 is on the housing 35 of the receiver 12 and is operably connected to a power source such as a battery to indicate to the electrician that it is in the receiving mode. A switch 39 is used to turn off the receiver when not used to conserve the battery. The receiver can as well be made to be free-standing or have a hanging hook on its housing such that it can be placed in the general vicinity of the electrician.

In operation, the electrician initially mounts the transmitter assembly at the conduit's terminus. After activating his receiver, he inserts the end of the fish tape into the conduit and forces it to travel through the conduit. If an obstruction has been reached and no signal is emitted, the electrician will know that he must continue to manipulate the fish tape until it travels further through the conduit. Eventually the fish tape end exits the conduit terminus and touches the striker plate of the contact switch. This causes the electronic transmitter to emit a signal which in turn is received by the receiver and the electrician is assured that the fish tape end extends pass the conduit's terminus. He then walks to the conduit terminus to securely attach an electric wire to the fish tape end, returns to the original site, and winds the fish tape back onto its reel. The electric wire is pulled through the conduit by the fish tape, cut and connected in a conventional fashion.

While the invention has been described in detail, it should be understood modifications can be made. For example, a light sensing switch or other known switches which are capable of detecting the fish tape end can be used. All changes of an obvious nature are considered within the scope of the appended claims.

I claim:

1. An electrician's fish tape locator system for the purpose of alerting the electrician that an end of a fish tape forced through a conduit has reached the conduit's terminus, comprising:

(a) a transmitter assembly for positioning at a terminus of the conduit, said assembly having a mounting means for attachment to the terminus of the conduit, a switch associated with the mounting means such that the fish tape end activates the switch as it exits the conduit terminus, and an electronic transmitter coupled to the switch so that a signal is transmitted in response to activation of the switch by the fish tape end; and (b) a receiver for receiving the signal transmitted from the transmitter and alerting the electrician as to the fish tape end reaching the conduit terminus.

2. The electrician's fish tape locator system of claim 1 wherein the switch of the transmitter assembly is a contact switch which is secured to the mounting means so as to be adjacent the conduit terminus and in alignment therewith.

3. The electrician's fish tape locator system of claim 2 wherein the mounting means of the transmitter assembly is a U-shaped bracket having a first leg with a slot to frictionally fit over the conduit and a second leg on which is mounted the contact switch.

4. The electrician's fish tape locator system of claim 3 wherein the transmitter assembly further comprises a jack plug coupling the contact switch to the electronic transmitter.

5. The electrician's fish tape locator system of claim 1 wherein the receiver has a belt clip for use in attaching said receiver to the electrician.

6. The electrician's fish tape locator system of claim 1 wherein the receiver emits sound in response to the signal received from the electronic transmitter.

7. The electrician's fish tape locator system of claim 1 wherein the receiver emits light in response to the signal received from the electronic transmitter.

8. The electrician's fish tape locator system of claim 1 wherein the receiver emits vibrations in response to the signal received from the electronic transmitter.

9. The electrician's fish tape locator system of claim 1 wherein the receiver further comprises a LED and a switch connected thereto so as to indicate when the receiver is in a receiving mode.

10. A method for an electrician to determine when an end of an electrician's fish tape forced through a conduit has reached a terminus of the conduit comprising:

(a) positioning a transmitter assembly on a terminus of the conduit, said transmitter assembly having a mounting means for attachment to the terminus of the conduit, a switch associated with the mounting means such that the fish tape end exiting the conduit terminus activates said switch, and an electronic transmitter coupled to the switch;

(b) positioning a receiver on or about the electrician; and (c) forcing the fish tape through the conduit until the end of said fish tape exits the conduit terminus to activate the switch and, in response to activation of the switch, the electronic transmitter transmits a signal to the receiver.

11. The method of claim 10 wherein the switch of the transmitter assembly is a contact switch secured to the mounting means so as to be adjacent the conduit terminus and in alignment therewith.

12. The method of claim 11 wherein the mounting means of the transmitter assembly is a U-shaped bracket having a first leg with a slot to frictionally fit over the conduit and a second leg on which is mounted the contact switch.

13. The method of claim 10 wherein the receiver emits sound in response to the signal received from the electronic transmitter.

14. The method of claim 10 wherein the receiver emits light in response to the signal received from the electronic transmitter.

15. The method of claim 10 wherein the receiver emits vibrations in response to the signal received from the electronic transmitter.

* * * * *